Patented Sept. 14, 1943

2,329,445

UNITED STATES PATENT OFFICE 2,329,445

THYROPROTEIN AND METHOD OF MAKING THE SAME

Charles Wesley Turner and Ezra Paul Reineke, Columbia, Mo., assignors to American Dairies, Inc., Kansas City, Mo., a corporation of Maryland, and to The Quaker Oats Company, Chicago, Ill., a corporation of New Jersey No Drawing. Application March 28, 1940, Serial No. 326,422

6 Claims. (Cl. 99—4)

This invention relates to a thyroprotein composition and a method of making the same which has among other valuable characteristics the properties of a galactogogue or the ability of increasing the yield and the percentage composition of the most valuable constituents of milk of lactating animals and in particular dairy cows. To accomplish this function the food composition here described, upon digestion and absorption into the blood stream, has the characteristic also of increasing general body metabolism, and the use of blood precursors of milk by the mammary gland.

In addition, in suitable amounts, this food composition will favorably influence the growth rate of immature animals, the metabolic activity and general well-being of animals with low general metabolism, the production of meat, wool, eggs, and working and racing capacity of horses. More specifically our food composition, influences favorably the rate of secretion by the anterior pituitary gland of hormones which influence the metabolism of fat, carbohydrates and proteins thereby reacting favorably on the physiological processes cited above.

The object of our invention is the production of a food composition combining iodine and skim milk or other proteinaceous materials, low or devoid of fat, in such form as to have new properties not present in either of the original ingredients. These properties are demonstrated upon the digestion and absorption of the food product in the animal body. Digestion either by chemicals or enzymes in vitro and separation by suitable means will increase the potency of the active chemical compound in the new food composition.

Our food composition is composed of two essential ingredients, protein and iodine. The skim milk may be replaced by any one of the following: the proteins of milk, casein or albumin; blood serum or its proteins (albumin and globulin), egg albumin, meat meal or its protein, or proteins from other animal sources; plant proteins such as are found in cotton seed meal, gluten meal, soybean meal, peanut meal, cocoanut meal or other high protein feeds.

Molecular iodine can be replaced by salts of iodine such as NaI, KI, NaIO$_3$, etc. by such chemical treatment as to release free iodine, (chlorination, bromination, etc.), processes well known to the art.

In practicing our invention there are several alternative methods of combining the first ingredient, the protein, with the second ingredient, the iodine, depending upon the state in which the first is available.

Example 1

When skim milk is used it is heated to about 37° C. (35°–40° C.), and finely powdered iodine is then slowly mixed into the milk. Sufficient has been added when free iodine appears. Based upon skim milk of average composition containing about 3.5% protein, it will require the addition of 150 to 300 grams of iodine per 100 lbs. of milk. The process may be facilitated by the addition of Na$_2$CO$_3$, NH$_4$OH or other mild alkali until a pH of about 9–11 is attained or by the addition of dilute acid to a pH of 2.3. The skim milk may now be neutralized, dried by the usual processes for preparing dried skim milk, known to the art, or the protein may be precipitated in part at a pH of 4.6 by the addition of dilute acid (or alkali) as required. The precipitate is removed, washed with several washings of water at a pH of 4.6, air dried and ground to a powder ready to feed. If a product of greater purity is desired it may be dialyzed before drying. This food product may then be incorporated in the feed such as a grain mixture or feed cubes or administered in pellets, capsules, etc., separately. When the product of our invention is to be added to cubed or other processed feeds, the moist precipitate may be used without preliminary drying.

Example 2

When the protein to be used is in aqueous solution or can conveniently be put into solution with mild alkali or acid, the powdered iodine can be added, as in skim milk, by heating and stirring, with subsequent precipitation of the protein at its isoelectric point, by vacuum drying or by other recovery processes known to the art.

When feeds such as cottonseed meal, linseed oil meal, etc. are used as a base their oil content should be low.

Example 3

The meal or protein in the dry form may be ground finely in a mill with from 5 to 15% of iodine, mixed thoroughly for a number of hours, then placed in a tight container with periodic mixing for a number of days until the product no longer gives a test for free iodine. The amount of iodine required can be determined by the point where free iodine remains after several weeks. When the amount is determined for a given feed, the same amount can be added to prepare additional lots.

*Example 4*

The milk protein or other suitable protein is placed in solution in an acid medium at a pH of approximately 1.8; a suitable quantity of pepsin is added, the temperature adjusted to 35 to 40° C. and digestion allowed to proceed for 12 hours or more. Either the whole of the digest may be iodinated following adjustment of the pH to 9 to 11, by the process described in Example 1 or 2, or the acid soluble material may be discarded, the acid insoluble material being brought into solution by adjusting to a pH of 8 or above with suitable alkali, and the material then iodinated by the procedure outlined in Example 1 or 2. The physiologically active material is recovered in solid form by isoelectric precipitation, drying or other methods well known to the art.

*Example 5*

The proteins from milk, blood or other suitable source can be digested by pepsin in aqueous acid solution as described in Example 4, following which the pH is adjusted to about 8 to 9 by addition of $Na_2CO_3$, $NH_4OH$ or other suitable alkali, following which .01 to 0.5% (on basis of dry weight of substrata) of trypsin is added. The temperature is adjusted to 35° to 40° C. and digestion allowed to proceed for 12 hours or more. Subsequently the whole digest may be iodinated according to the procedure outlined in Example 1 or 2. An alternative method, resulting in a product of greater potency can be carried out by precipitating the acid insoluble material by adjusting the pH to approximately 3 to 5 and discarding the supernatant fluid, following which the precipitate is redissolved by adjusting the pH to above neutral (9 to 11) following which the proteinaceous material is iodinated according to the procedure outlined in Examples 1 and 2. Subsequently the active material is recovered by isoelectric precipitation or other methods well known to the art.

*Example 6*

The protein from milk or other suitable source, either before or after iodination, can be hydrolyzed by refluxing with alkalies such as $Ba(OH)_2$ for a period of about 20 hours or with dilute acids for 4 to 6 hours. If the protein has been iodinated previous to hydrolysis, the active material is recovered by isoelectric precipitation at a pH between 3 and 5. If the iodination is performed subsequent to hydrolysis, the hydrolytic product precipitable at a pH between 3 and 5 is recovered, dissolved in alkali or $Na_2CO_3$ and iodinated as in Example 1.

Various changes may be made in the details disclosed in the foregoing specifications without departing from the invention or sacrificing the advantages thereof.

We claim:

1. An artificial thyroprotein, comprising proteinaceous material iodinated to the extent that free iodine appears in the mixture.

2. An artificial thyroprotein, comprising milk protein iodinated to the extent that free iodine appears in the mixture.

3. An artificial thyroprotein, comprising a proteinaceous material combined with iodine compounds, the constituents being present in the ratio of 100 grams of proteinaceous material to 5 to 15 grams of iodine compound.

4. An artificial thyroprotein, comprising animal protein iodinated to the extent that free iodine appears in the mixture.

5. An artificial thyroprotein, comprising proteins of vegetable origin, iodinated to the extent that free iodine appears in the mixture.

6. A method of producing an artificial thyroprotein, comprising the steps of adding iodine compounds to a proteinaceous material until free iodine appears in the mixture.

CHARLES WESLEY TURNER.
EZRA PAUL REINEKE.